United States Patent
Sasabuchi et al.

(10) Patent No.: US 9,815,459 B2
(45) Date of Patent: Nov. 14, 2017

(54) COLLISION AVOIDANCE SUPPORT DEVICE

(71) Applicant: HONDA MOTOR CO., LTD., Minato-ku, Tokyo (JP)

(72) Inventors: Yoji Sasabuchi, Tochigi-ken (JP); Satoshi Kondo, Utsunomiya (JP); Shigeru Omura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 31 days.

(21) Appl. No.: 14/976,123

(22) Filed: Dec. 21, 2015

(65) Prior Publication Data

US 2016/0185345 A1 Jun. 30, 2016

(30) Foreign Application Priority Data

Dec. 25, 2014 (JP) .................................. 2014-263014

(51) Int. Cl.
*B60W 30/09* (2012.01)
*B60W 30/08* (2012.01)

(52) U.S. Cl.
CPC ............ *B60W 30/08* (2013.01); *B60W 30/09* (2013.01); *B60W 2510/06* (2013.01); *B60W 2550/10* (2013.01)

(58) Field of Classification Search
CPC .......................... B60W 30/08; B60W 2550/10
See application file for complete search history.

(56) References Cited

U.S. PATENT DOCUMENTS

| | | | |
|---|---|---|---|
| 8,301,344 B2 | 10/2012 | Simon et al. | |
| 9,275,548 B2 | 3/2016 | Pink | |
| 2008/0189040 A1* | 8/2008 | Nasu | G08G 1/163 701/301 |
| 2015/0336579 A1* | 11/2015 | Yoshizawa | B60W 30/08 701/70 |
| 2016/0185345 A1* | 6/2016 | Sasabuchi | B60W 30/08 701/301 |

FOREIGN PATENT DOCUMENTS

| | | |
|---|---|---|
| DE | 10336638 A1 | 2/2005 |
| DE | 102013208763 A1 | 11/2014 |
| JP | 2004094733 A | 3/2004 |

(Continued)

OTHER PUBLICATIONS

Machine Translation of JP 2004-094733, retrieved from Espacenet.*

(Continued)

*Primary Examiner* — Thomas Ingram
(74) *Attorney, Agent, or Firm* — Carrier Blackman & Associates, P.C.; Joseph P. Carrier; Jeffrey T. Gedeon

(57) ABSTRACT

A classification determining unit determines classification of a stationary object that is detected by a stationary object detecting unit. In a case where it is determined that the stationary object is another vehicle, a judgment condition easing unit enlarges a margin area that is used when determining the need for collision avoidance support. When the margin area is enlarged, the probability for a user's own vehicle to interfere with the margin area increases. Stated otherwise, it becomes easier for a collision avoidance determining unit to determine that the collision avoidance support is needed.

7 Claims, 10 Drawing Sheets

(56) References Cited

FOREIGN PATENT DOCUMENTS

JP    2008191781 A    8/2008
JP    2011-085476 A   4/2011

OTHER PUBLICATIONS

Office Action dated Sep. 6, 2016 issued over the corresponding Japanese Patent Application No. 2014-263014 with the English translation of pertinent portion.
Search Report dated Sep. 29, 2016 issued over the corresponding German Patent Application No. 102015226715.6 with English translation.
Office Action dated Sep. 29, 2016 issued over the corresponding German Patent Application No. 102015226715.6 with English translation.

* cited by examiner

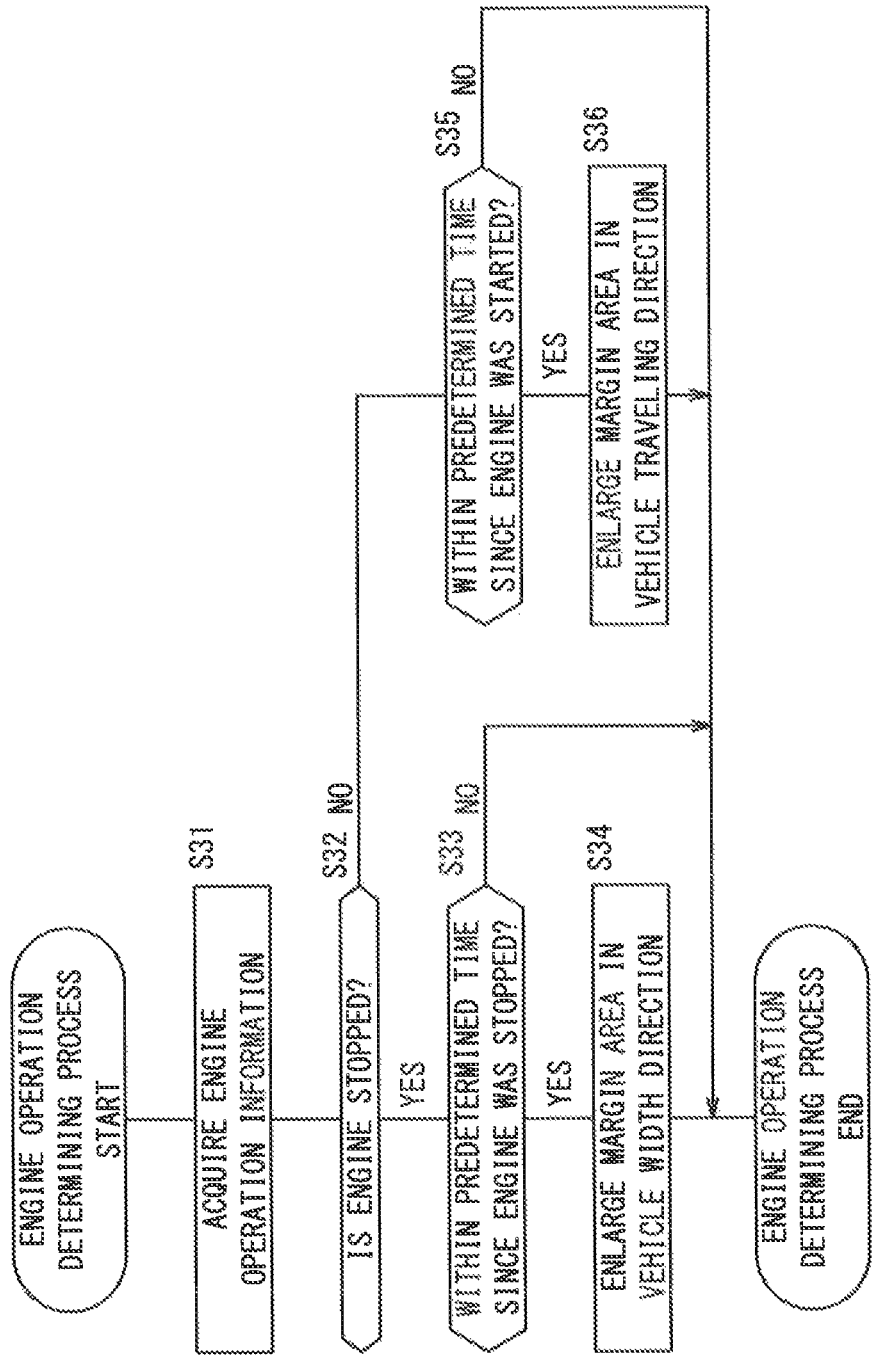

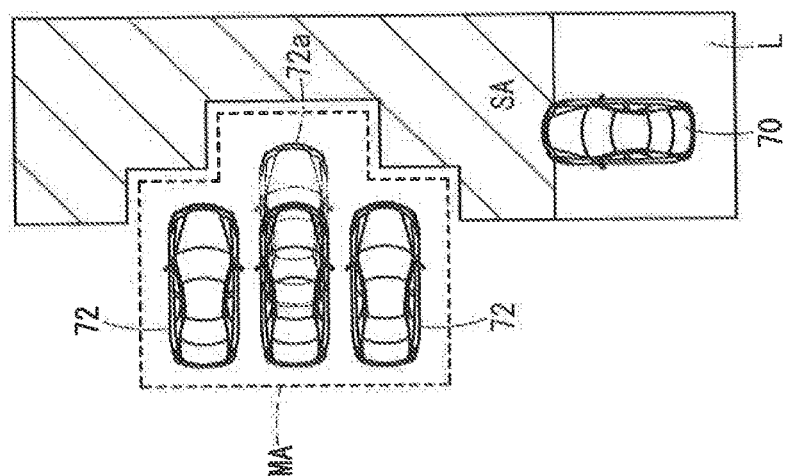
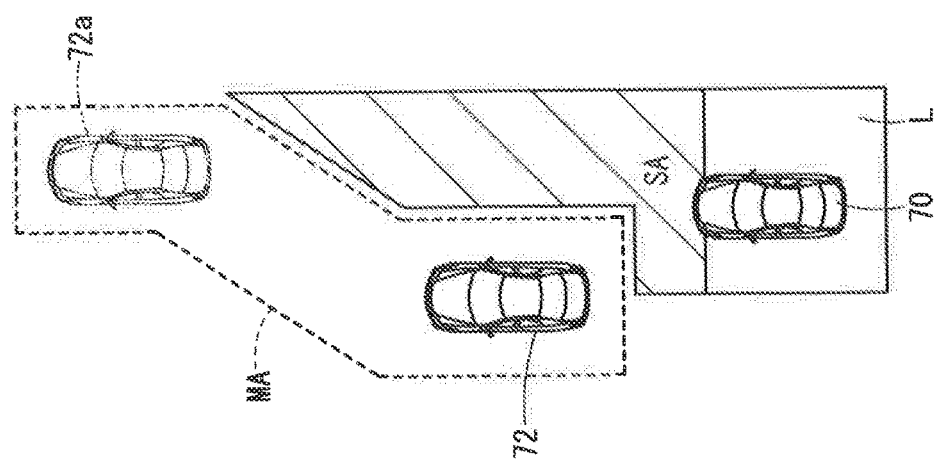

200c
COLLISION AVOIDANCE SUPPORT DEVICE

CROSS-REFERENCE TO RELATED APPLICATION

This application is based upon and claims the benefit of priority from Japanese Patent Application No. 2014-263014 filed on Dec. 25, 2014, the contents of which are incorporated herein by reference.

BACKGROUND OF THE INVENTION

Field of the Invention

The present invention relates to a collision avoidance support device for performing assistance to avoid a collision between a traveling vehicle and a stationary vehicle.

Description of the Related Art

In recent years, collision avoidance support devices have been installed in vehicles for the purpose of avoiding collisions with objects such as stopped or parking vehicles, obstacles, pedestrians, etc. Such a collision avoidance support device performs a determination based on predetermined judgment conditions for determining whether or not collision avoidance is necessary. As one such judgment condition, as shown for example in FIG. 10, a virtual space is set that surrounds a forward object 102 positioned in the periphery of a user's own vehicle 100. The virtual space is referred to as a margin area MA. The collision avoidance support device detects the forward object 102 by means of a camera or a radar system provided on the user's own vehicle 100, and sets the margin area MA in the vicinity of a stationary object or a moving object that is detected. In addition, the collision avoidance support device predicts the possibility of interference between the user's own vehicle 100 and the margin area MA, and if it is determined that there is a possibility of interference, automatic steering and/or automatic braking is controlled in order to avoid a collision.

In Japanese Laid-Open Patent Publication 2011-085476 (paragraphs [0042], [0044], FIG. 5), a collision avoidance support device is disclosed that avoids a collision between the user's own vehicle and a moving object (motorcycle) that crosses in front of the user's own vehicle. The collision avoidance support device replaces a detected moving object with a margin area having a predetermined length, and further, increases the length of the margin area corresponding to the movement speed of the moving object.

SUMMARY OF THE INVENTION

In Japanese Laid-Open Patent Publication No. 2011-085476, a technique is disclosed by which an optimal margin area is set around the periphery of a moving object (motorcycle). However, the disclosure is silent concerning setting of an optimal margin area around the periphery of a stationary object (a wall, or a vehicle parked on the street, etc.).

Conventionally, in the case of setting a margin area MA around the periphery of a stationary object, a margin area MA having a large margin width is set around the periphery of the stationary object. However, if the margin width is too large, a safety area SA that is set on the traveling path outside of the margin area MA becomes too small. At this time, the collision avoidance support device cannot recognize a correct safety area SA, and there is a concern of hindering travel of the vehicle. If a margin area MA having a small margin width is set around the periphery of the stationary object, then the collision avoidance support device is capable of recognizing a correct safety area SA. However, in the case that the stationary object is a vehicle, the stationary state of the vehicle may suddenly change, such as when the vehicle suddenly starts to move, or a door of the vehicle is suddenly opened. Thus, there is a fear that, if the stationary state of the vehicle suddenly changes, it will be impossible to avoid a collision.

The present invention has been devised taking into consideration the aforementioned problems, and has the object of providing a collision avoidance support device, which is capable of performing an appropriate collision avoidance support depending on the state of a stationary object.

The present invention is characterized by a collision avoidance support device, containing a stationary object detecting unit configured to detect a stationary object, and a collision avoidance determining unit configured to determine a need for collision avoidance support in relation to the stationary object based on a predetermined judgment condition. In the event the collision avoidance determining unit determines that there is a need for collision avoidance support, the collision avoidance support device performs the collision avoidance support. The collision avoidance support device further contains a classification determining unit configured to determine a classification of the stationary object, and a judgment condition easing unit configured to, in the event the classification determining unit determines that the stationary object is a vehicle, ease the judgment condition, and thereby make it easier for the collision avoidance determining unit to determine that the collision avoidance support is needed.

There is a possibility for the stationary state to suddenly change such as, for example, if the vehicle suddenly starts to move or a door of the vehicle is suddenly opened, etc. In the present invention, it is determined whether or not the stationary object is a vehicle, and if it is determined to be a vehicle, a predetermined condition, which is used when determining the need for collision avoidance support, is eased, and thus it is made easier to determine that the collision avoidance support is needed. According to the present invention, a collision avoidance support can be enabled with respect to a stationary vehicle, with starting or opening of a door of the vehicle being taken into account. More specifically, a collision avoidance support which is suitable for a vehicle that is stationary can be carried out.

Further, in the present invention, in the event there is an occupant riding in the vehicle, the judgment condition easing unit may ease the judgment condition, and thereby make it easier for the collision avoidance determining unit to determine that the collision avoidance support is needed.

According to the present invention, in the case there is an occupant who is riding in the vehicle that is stationary, it is judged that starting or opening of a door of the vehicle may occur, and thus it can be made easier to determine that there is a need for the collision avoidance support. More specifically, a collision avoidance support which is suitable for a vehicle with an occupant riding therein can be carried out.

Further, in the present invention, the judgment condition easing unit may ease the judgment condition the more, the greater a movement amount of a door of the vehicle becomes in a width direction of the vehicle, and thereby make it easier for the collision avoidance determining unit to determine that the collision avoidance support is needed.

According to the present invention, in the case of a vehicle for which a door thereof opens greatly, it can be made easier to determine that the collision avoidance support is necessary when the door opens. More specifically, a collision avoidance support which is suitable for a vehicle for which movement of a door is large in a width direction of the vehicle can be carried out.

Further, in the present invention, in the event that an engine of the vehicle is stopped, the judgment condition easing unit may ease the judgment condition in the width direction of the vehicle, and thereby make it easier for the collision avoidance determining unit to determine that the collision avoidance support is needed.

According to the present invention, in the case that the engine of a stationary vehicle is stopped, it is judged that opening of a door of the vehicle is likely to occur, and thus it can be made easier to determine that there is a need for the collision avoidance support in the width direction of the vehicle. More specifically, a collision avoidance support which is suitable for a vehicle that is stopped can be carried out.

Further, in the present invention, in the event it is within a predetermined time period since the engine of the vehicle was stopped, the judgment condition easing unit may ease the judgment condition in the width direction of the vehicle, and thereby make it easier for the collision avoidance determining unit to determine that the collision avoidance support is needed.

According to the present invention, if it is within a predetermined time period since the engine of the stationary vehicle was stopped, it is judged that the engine has been stopped for the purpose of disembarking from the vehicle, and thus it can be made easier to determine that there is a need for the collision avoidance support in the width direction of the vehicle. More specifically, a collision avoidance support which is suitable for a vehicle that resides within a predetermined time period since stopping of the vehicle can be carried out.

Further, in the present invention, in the event that an engine of the vehicle is being started, the judgment condition easing unit may ease the judgment condition in the traveling direction of the vehicle, and thereby make it easier for the collision avoidance determining unit to determine that the collision avoidance support is needed.

According to the present invention, if the engine of a stationary vehicle is being started, it is judged that traveling of the vehicle is likely to start, and thus it can be made easier to determine that there is a need for the collision avoidance support in the traveling direction of the vehicle. More specifically, a collision avoidance support which is suitable for a vehicle whose engine is being started can be carried out.

Further, in the present invention, in the event it is within a predetermined time period since the engine of the vehicle was started, the judgment condition easing unit may ease the judgment condition in the traveling direction of the vehicle, and thereby make it easier for the collision avoidance determining unit to determine that the collision avoidance support is needed.

According to the present invention, if it is within a predetermined time period since the engine of a stationary vehicle was started, it is judged that traveling of the vehicle is likely to start, and thus it can be made easier to determine that there is a need for the collision avoidance support in the traveling direction of the vehicle. More specifically, a collision avoidance support which is suitable for a vehicle that resides within a predetermined time period since starting of the engine of the vehicle can be carried out.

Further, in the present invention, in the event that the gears of the vehicle are in a driving range, the judgment condition easing unit may ease the judgment condition in the traveling direction of the vehicle corresponding to the driving range, and thereby make it easier for the collision avoidance determining unit to determine that the collision avoidance support is needed.

According to the present invention, if the gears of the stationary vehicle are set within the driving range, it is judged that traveling of the vehicle is likely to start, and thus it can be made easier to determine that there is a need for the collision avoidance support in the traveling direction of the vehicle. More specifically, a collision avoidance support which is suitable for a vehicle whose gears are set within the driving range can be carried out.

Further, in the present invention, in the event that a steering input is made with respect to the vehicle, the judgment condition easing unit may ease the judgment condition in the width direction of the vehicle, and thereby make it easier for the collision avoidance determining unit to determine that the collision avoidance support is needed.

According to the present invention, in the case that a steering input is made with respect to a vehicle that is stationary, it is judged that the vehicle is likely to move in a width direction of the vehicle, and thus it can be made easier to determine that there is a need for the collision avoidance support in the width direction of the vehicle. More specifically, a collision avoidance support which is suitable for a vehicle to which a steering input is made can be carried out.

Further, in the present invention, in the event that the vehicle is stopped on a road shoulder, the judgment condition easing unit may ease the judgment condition in the width direction of the vehicle, and thereby make it easier for the collision avoidance determining unit to determine that the collision avoidance support is needed.

According to the present invention, if a vehicle that is stationary is stopped on a road shoulder, it is judged that the vehicle is likely to move in a width direction of the vehicle and return to the lane, and thus it can be made easier to determine that there is a need for the collision avoidance support in the width direction of the vehicle. More specifically, a collision avoidance support which is suitable for a vehicle which is stopped on a road shoulder can be carried out.

In the present invention, an area in which collision avoidance is needed with respect to the stationary object may be set as the judgment condition, and the judgment condition easing unit may ease the judgment condition by enlarging the area, and thereby make it easier for the collision avoidance determining unit to determine that the collision avoidance support is needed.

According to the present invention, since the area where collision avoidance is necessary is set as a judgment condition, by changing the area, collision avoidance support can be performed with higher accuracy.

According to the present invention, a collision avoidance support can be enabled with respect to a stationary vehicle, in which starting or opening of a door of the vehicle is considered. More specifically, a collision avoidance support which is suitable for a vehicle that is stationary can be carried out.

The above and other objects features and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a flowchart for describing an engine operation determining process;

FIGS. 6A and 6B are schematic views showing margin areas that are enlarged in a vehicle traveling direction;

DESCRIPTION OF THE PREFERRED EMBODIMENTS

Figure 1:
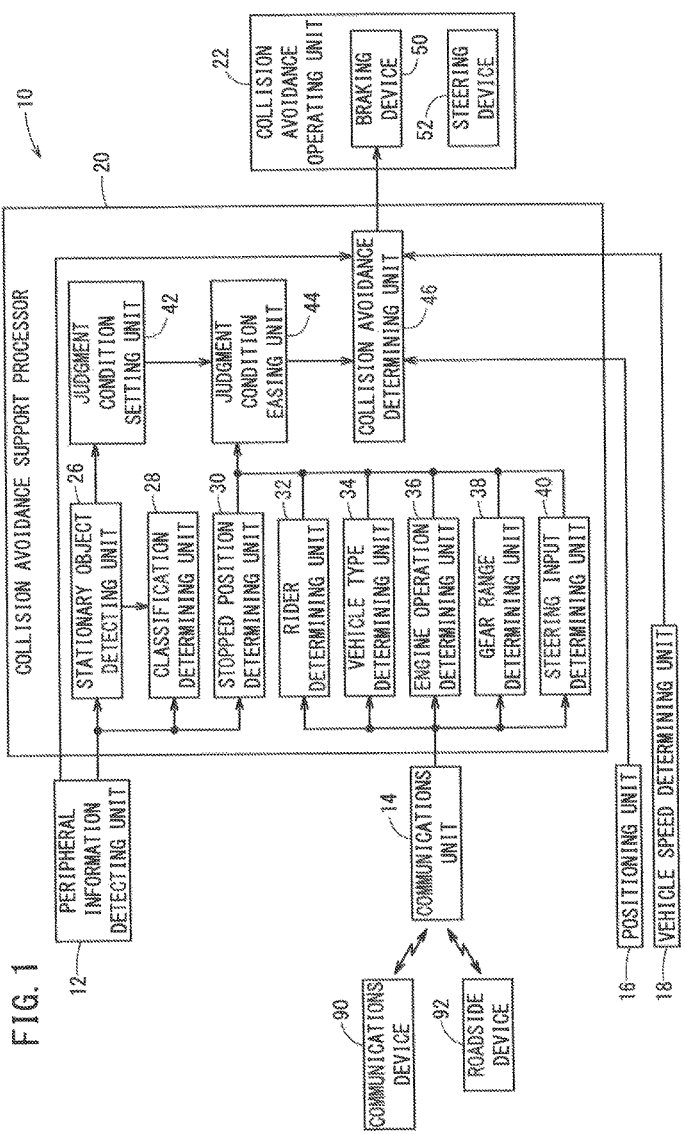
FIG. 1 is a block diagram of a collision avoidance support device according to an embodiment of the present invention.
Figure 2:
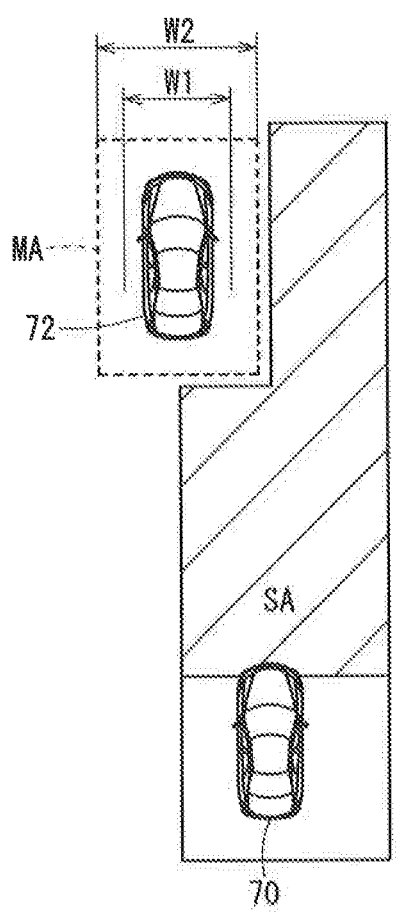
FIG. 2 is a schematic view showing a margin area that is enlarged in a vehicle width direction.

A preferred embodiment of a collision avoidance support device according to the present invention will be described in detail below with reference to the accompanying drawings. FIG. 1 is a block diagram of a collision avoidance support device 10 according to an embodiment of the present invention. FIG. 2 is a schematic view showing a margin area MA that is enlarged in a vehicle width direction.

According to the present embodiment, as shown in FIG. 2, a user's own vehicle 70 sets a margin area MA around another vehicle 72 as a judgment condition for determining the need for collision avoidance support with respect to the other vehicle 72. Further, by enlarging the margin area MA, it is made easier to determine that the collision avoidance support is needed. In the following description, a stationary vehicle, a stationary pedestrian, a wall, and an obstacle or the like are referred to as stationary objects, whereas a moving vehicle, and a moving pedestrian or the like are referred to as moving objects.

[Configuration of Collision Avoidance Support Device 10]

The collision avoidance support device 10 comprises a peripheral information detecting unit 12 that detects stationary objects and moving objects around the periphery of the user's own vehicle 70, a communications unit 14 for performing communication with the exterior of the vehicle, a positioning unit 16 that acquires the position of the user's own vehicle 70, a vehicle speed determining unit 18 for detecting the vehicle speed, a collision avoidance support processor 20 that performs general overall processing for the collision avoidance support, and a collision avoidance operating unit 22 that is operated when avoiding a collision.

The peripheral information detecting unit 12 comprises a device that detects respective detection target objects such as stationary objects, moving objects, roads, etc., around the periphery of the user's own vehicle, and measures the positions of the respective detection target objects. More specifically, the peripheral information detecting unit 12 is equipped with devices such as a millimeter-wave radar, a microwave radar, a laser radar, an infrared sensor, an ultrasonic sensor, an optical camera, etc., for actively detecting the respective detection target objects around the periphery of the user's own vehicle. Further, the peripheral information detecting unit 12 may further be equipped with devices for acquiring detection information of respective detection target objects, which is transmitted from roadside devices such as beacons or the like. Furthermore, the peripheral information detecting unit 12 may be equipped with devices for acquiring detection information of respective detection target objects, which is transmitted from cameras, radar systems or the like that are disposed on the road.

The communications unit 14 comprises a device that performs vehicle-to-vehicle communications with a communications device 90 that is provided on the other vehicle 72, or performs road-to-vehicle communications with roadside devices 92. In the case that road-to-vehicle communications are performed, information of the other vehicle 72 can be acquired through the roadside devices 92.

The positioning unit 16 comprises a device for measuring the position of the user's own vehicle 70, and is configured so as to be capable of measuring the position of the user's own vehicle 70 by way of radio navigation using a GPS receiver, and by way of autonomous navigation using a gyro sensor and a G sensor or the like.

The vehicle speed determining unit 18 comprises a device for measuring the vehicle speed of the user's own vehicle 70. For example, the vehicle speed determining unit 18 comprises plural wheel speed sensors that detect the individual rotational speeds of the respective vehicle wheels, and determines the vehicle speed based on the rotational velocities of the wheels detected by the plural wheel speed sensors.

The collision avoidance support processor 20 is constituted by an ECU (electronic control unit) that is mounted in the user's own vehicle. As is well known, the ECU is a computational device including a microcomputer, and more specifically including a CPU (central processing unit), a ROM (including an EEPROM) and a RAM (random access memory), which serve as memories, input/output devices such as A/D converters, D/A converters, etc., and a timer that serves as a time measuring unit. By the CPU reading out and executing programs stored in the ROM, the ECU functions as various function realizing units (function realizing means), for example, a control unit, a calculating unit, and a processing unit, etc. Such functions can also be realized by hardware components. Further, the ECU can be integrated in an individual unit, or can be further divided across multiple units. According to the present embodiment, by executing programs in the ECU, the ECU functions as the various units described below.

A stationary object detecting unit 26 detects stationary objects from among respective detection target objects that are detected by the peripheral information detecting unit 12. For example, the stationary object detecting unit 26 recognizes the respective detection target objects that are detected by the peripheral information detecting unit 12, determines speeds of movement of the respective detection target objects, judges detection target objects for which the speeds thereof are zero, as being stationary objects, and judges detection target objects for which the speeds thereof are other than zero, as being moving objects. At this time, the stationary object detecting unit 26 also determines the positions of the stationary objects.

A classification determining unit 28 determines classifications of the stationary objects that are detected by the stationary object detecting unit 26. For example, classifications of stationary objects such as vehicles or pedestrians on the road, and walls or guard rails, etc., that are disposed alongside the road are determined by way of image matching such as template matching (pattern matching).

A stopped position determining unit 30 determines the positions of stationary objects that are judged to be vehicles by the classification determining unit 28, and more specifically, determines the stopped position of the other vehicle 72. In greater detail, based on position information of the respective detection target objects that are detected by the peripheral information detecting unit 12, it is determined whether or not the other vehicle 72 that is determined by the classification determining unit 28 is stopped on a road shoulder.

A rider determining unit 32 determines whether or not a driver or passenger is present in the other vehicle 72. The other vehicle 72 determines the presence or absence of a driver or passenger in the other vehicle 72 based on, for example, the detection results of pressure sensors or the like that are disposed in the respective seats of the vehicle, or the establishment of communications with portable devices of a smart key system or the like. Apart therefrom, the presence or absence of a driver or passenger may be determined based on any signals indicative of the presence of a driver or passenger, such as a detection result of sensors disposed in the seat belts, an ignition-on signal, or the like. In addition, rider information in relation to a driver or a passenger is output externally through the communications device 90. The rider determining unit 32 acquires the rider information of the other vehicle 72 through the communications unit 14.

A vehicle type determining unit 34 determines the type or model of the other vehicle 72. Furthermore, the vehicle type determining unit 34 determines the movement amount of the door in the width direction of the vehicle when a door of the vehicle is open. The other vehicle 72 outputs the type information thereof externally through the communications device 90. The vehicle type determining unit 34 acquires the type information of the other vehicle 72 through the communications unit 14.

An engine operation determining unit 36 determines whether or not the engine of the other vehicle 72 is currently being operated. Further, in the case that the engine is being operated, the elapsed time since the engine was started is determined, and in the case that the engine is stopped, the elapsed time since the engine was stopped is determined. The other vehicle 72 determines whether the engine is operating or stopped from the state of the ignition switch. In addition, engine operation information in relation to operating and stopping of the engine is output externally through the communications device 90. The engine operation determining unit 36 acquires the engine operation information of the other vehicle 72 through the communications unit 14.

A gear range determining unit 38 determines whether or not the gears of the other vehicle 72 are in a driving range. The other vehicle 72 determines the gear range based on the detection result of a shift sensor that is disposed on a shift lever (shift button) or an inhibitor switch. In addition, the gear range information is output externally through the communications device 90. The gear range determining unit 38 acquires the gear range information of the other vehicle 72 through the communications unit 14.

A steering input determining unit 40 determines whether or not the steering handle of the other vehicle 72 is currently being operated. The other vehicle 72 determines the presence or absence of a steering input based on a detection result of a steering angle sensor provided in the steering device. In addition, the steering input information is output externally through the communications device 90. The steering input determining unit 40 acquires the steering input information of the other vehicle 72 through the communications unit 14.

A judgment condition setting unit 42 sets a judgment condition that is used when determining the need for collision avoidance support, based on a stationary object that is detected by the stationary object detecting unit 26. As a judgment condition according to the present embodiment, a margin area MA around the periphery of the stationary object is set. The judgment condition setting unit 42 temporarily sets the margin area MA to have a fixed margin width with respect to the stationary object.

A judgment condition easing unit 44 eases the predetermined judgment condition based on the stopped state of the other vehicle 72. According to the present embodiment, the margin area MA that has been set temporarily by the judgment condition setting unit 42 is enlarged and reset based on the information of whether or not the stationary object is stopped on a road shoulder as determined by the stopped position determining unit 30, the rider information that is acquired by the rider determining unit 32, the vehicle type information acquired by the vehicle type determining unit 34, the engine operation information acquired by the engine operation determining unit 36, the gear range information determined by the gear range determining unit 38, and the steering input information determined by the steering input determining unit 40. When the margin area (MA) is enlarged, the probability for the user's own vehicle 70 to interfere with the margin area MA increases. More specifically, when the margin area MA is enlarged, it is made easier to determine that the collision avoidance support is needed. Further, if there is no information suggesting that the margin area MA should be enlarged, such in the case that the stationary object is not a vehicle, etc., the judgment condition easing unit 44 keeps the margin area MA that is set in the judgment condition setting unit 42, as is without being enlarged.

A collision avoidance determining unit 46 determines the need for collision avoidance support with respect to the stationary object based on the judgment condition. According to the present embodiment, whether or not there is a concern that the user's own vehicle 70 is likely to interfere with the margin area MA is determined based on the distance between the user's own vehicle 70 and the other vehicle 72 that is detected by the peripheral information detecting unit 12, the position of the user's own vehicle 70 that is measured by the positioning unit 16, the vehicle speed that is measured by the vehicle speed determining unit 18, and the position of the margin area MA that is set by the judgment condition easing unit 44. Further, a predicted time to collision (TTC) is calculated. In addition, in the case there is a concern of interfering with the margin area MA, a need for collision avoidance support is determined, and an instruction signal is output instructing that collision avoidance support be provided within the predicted time to collision.

The collision avoidance operating unit 22 comprises a device that performs collision avoidance support in the event the collision avoidance determining unit 46 of the collision avoidance support processor 20 judges that collision avoidance support is needed. The collision avoidance operating unit 22, for example, is equipped with an automatically operated braking device 50, and an automatically operated steering device 52. The braking device 50 controls a braking pressure, and operates the brakes automatically based on an instruction signal that is output from the collision avoidance determining unit 46. The steering device 52 controls an electric motor, and operates the steering handle based on an instruction signal that is output from the collision avoidance determining unit 46.

[Operations of the Collision Avoidance Support Device 10]

Next, operations of the collision avoidance support device 10 will be described with reference to the flowcharts of FIGS. 3, 4, 5, 7, 8, and 9.

Figure 3:
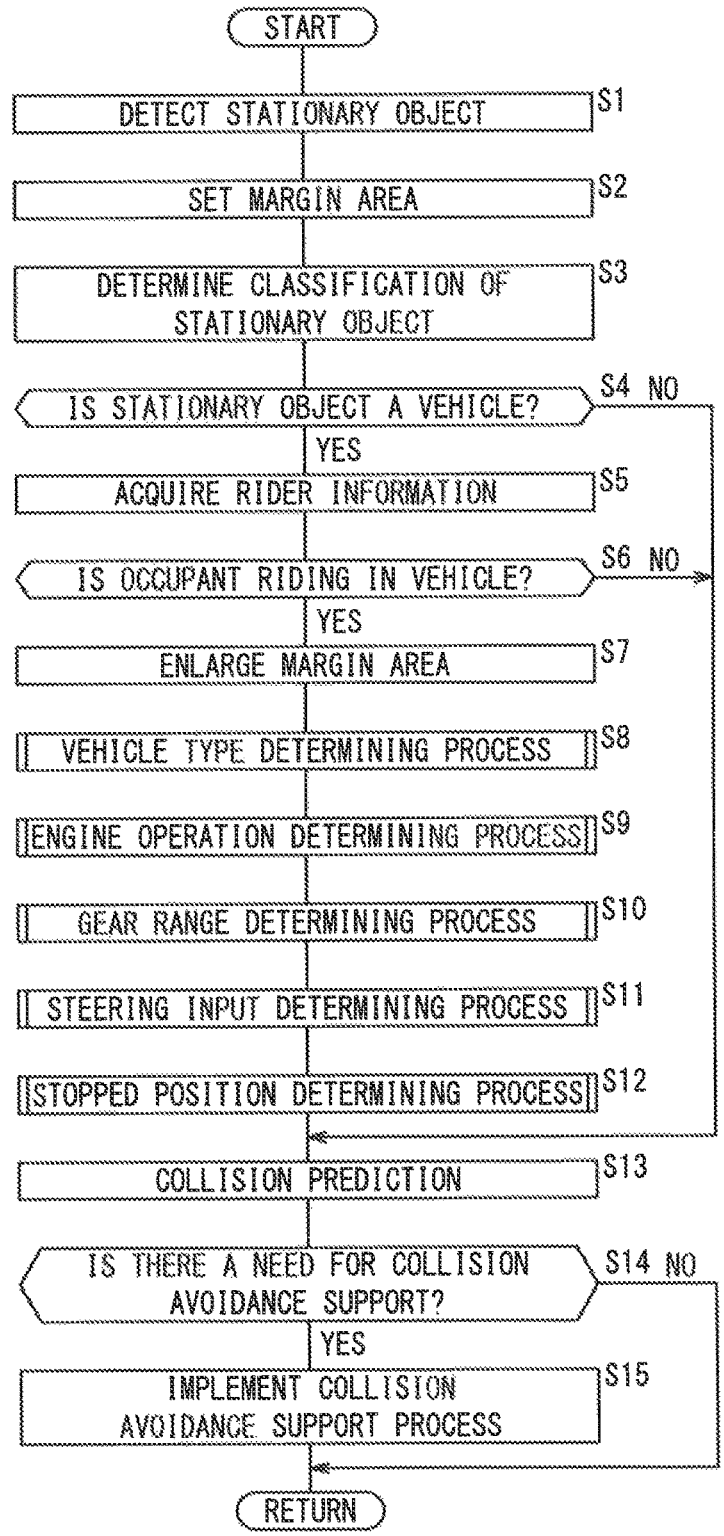
FIG. 3 is a flowchart for describing operations of the collision avoidance support device.

FIG. 3 is a flowchart for describing a series of processes that are carried out by the collision avoidance support device 10. A main body of such operations is the collision avoidance support processor 20. The collision avoidance support processor 20 carries out the following processes in relation to respective detection target objects that are detected by the peripheral information detecting unit 12.

In step S1, the stationary object detecting unit 26 detects a stationary object from among respective detection target objects that are detected by the peripheral information detecting unit 12. In step S2, the judgment condition setting unit 42 temporarily sets a margin area MA around the periphery of the stationary object that was detected by the stationary object detecting unit 26.

In step S3, the classification determining unit 28 determines the classification of the stationary object. In step S4, it is determined whether or not the stationary object is a vehicle. If the stationary object is a vehicle (step S4: YES), the routine proceeds to step S5, and the collision avoidance support process is continued with respect to the vehicle. If the stationary object is not a vehicle (step S4: NO), the routine proceeds to step S13, and the collision avoidance support process is carried out with respect to a normal stationary object (a stationary object whose stopped state does not change).

In step S5, the rider determining unit 32 acquires rider information of the other vehicle 72 through the communications unit 14. In addition, in step S6, it is determined whether or not an occupant is riding in the other vehicle 72. If an occupant is riding in the vehicle (step S6: YES), the routine proceeds to step S7, and the collision avoidance support process is continued with respect to the vehicle. If an occupant is not riding in the vehicle (step S6: NO), the routine proceeds to step S13, and the collision avoidance support process is carried out with respect to a normal stationary object.

In step S7, the judgment condition easing unit 44 enlarges the margin area MA that was set by the judgment condition setting unit 42. For example, as shown in FIG. 2, the judgment condition easing unit 44 enlarges the length in the vehicle width direction of the margin area MA that is set around the periphery of the other vehicle 72 from its initial value of W1 to W2. At this time, the size of the margin area MA may also be enlarged in its entirety.

Figure 4:
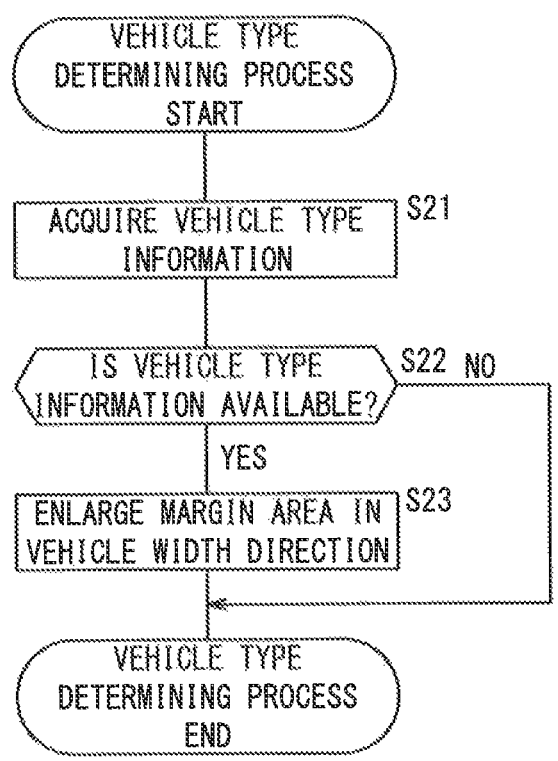
FIG. 4 is a flowchart for describing a vehicle type determining process.
Figure 7:
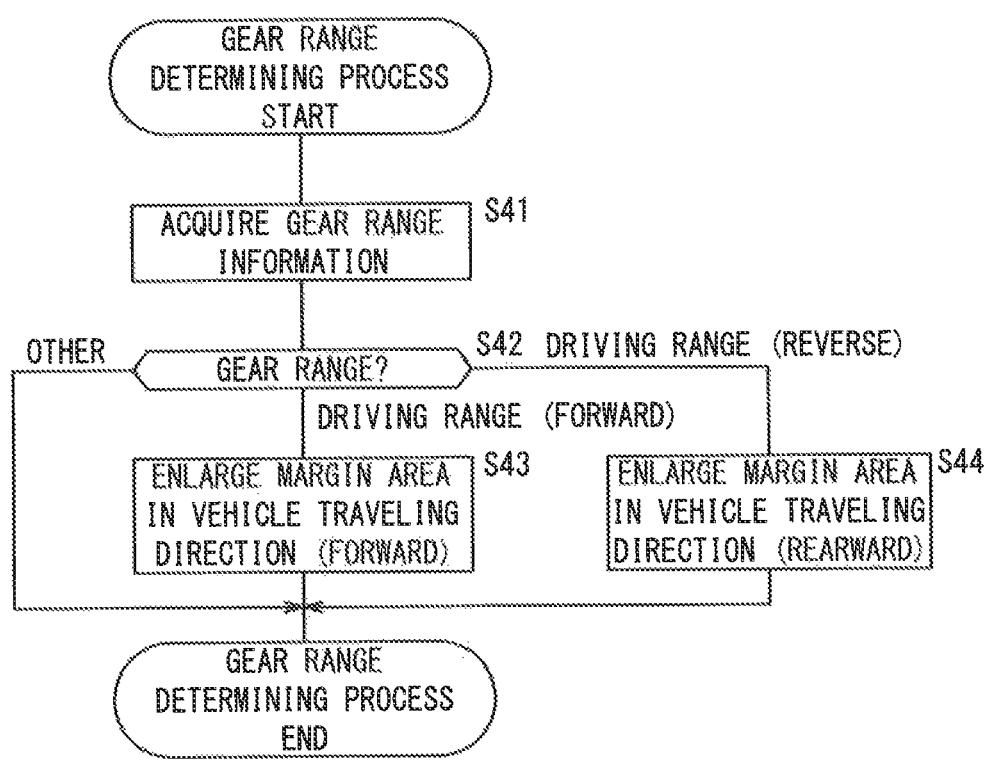
FIG. 7 is a flowchart for describing a gear range determining process.
Figure 8:
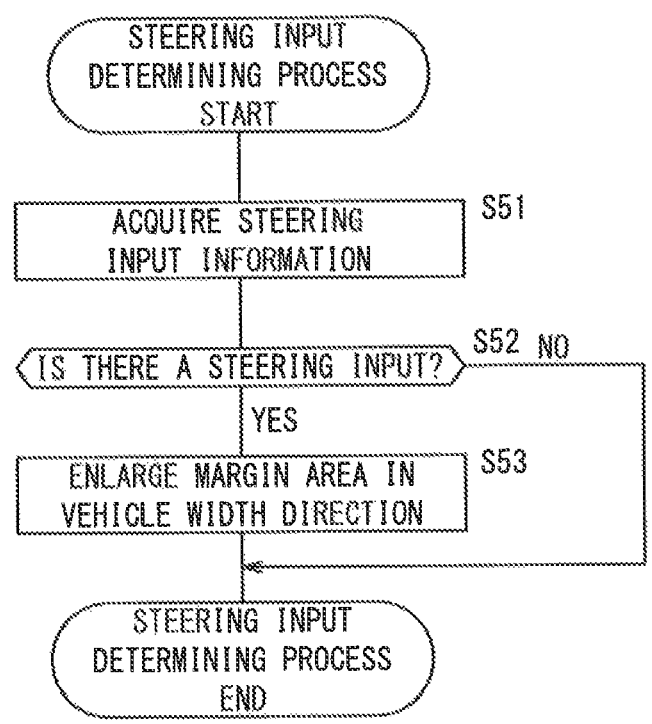
FIG. 8 is a flowchart for describing a steering input determining process.
Figure 9:
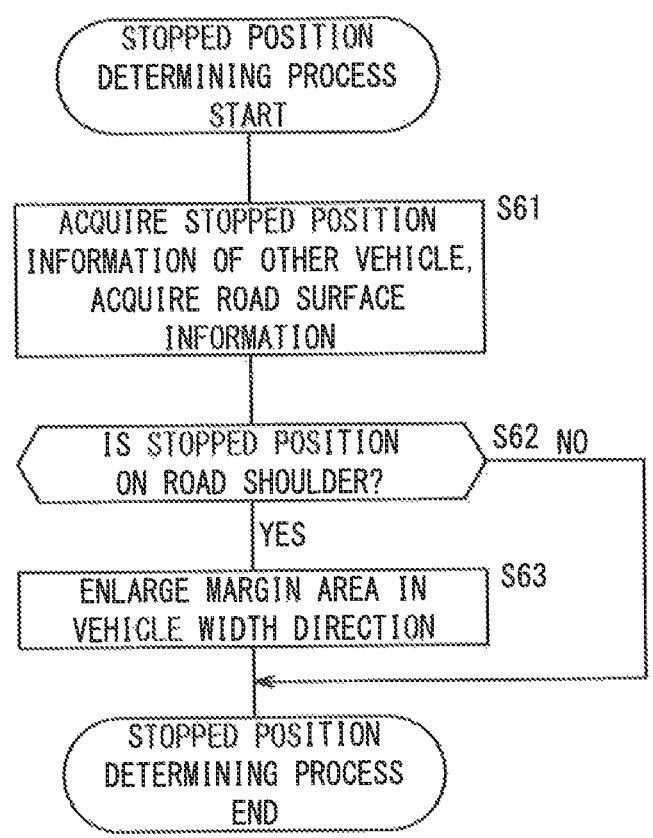
FIG. 9 is a flowchart for describing a stopped position determining process.
Figure 10:
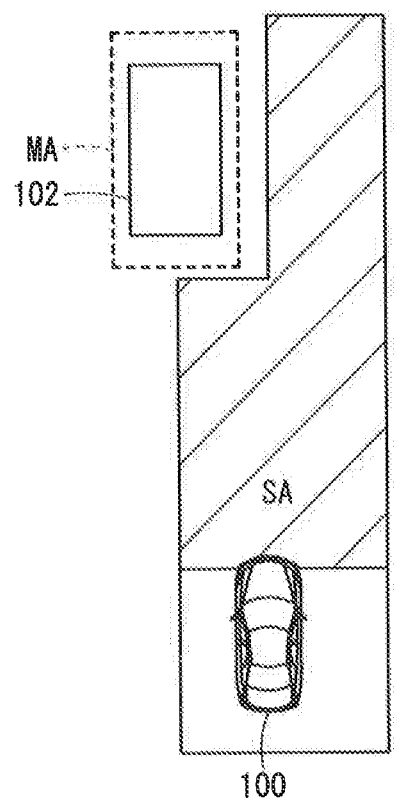
FIG. 10 is a schematic view showing a margin area.

In steps S8 through S12, processing is performed for determining whether or not to enlarge the margin area MA corresponding to the stopped state of the other vehicle 72. In step S8, a vehicle type determining process shown in FIG. 4 is performed. In step S9, an engine operation determining process shown in FIG. 5 is performed. In step S10, a gear range determining process shown in FIG. 7 is performed. In step S11, a steering input determining process shown in FIG. 8 is performed. In step S12, a stopped position determining process shown in FIG. 9 is performed.

In step S13, the collision avoidance determining unit 46 performs a prediction of a collision. The collision avoidance determining unit 46 acquires the position of the margin area MA as set by the judgment condition easing unit 44, the distance between the user's own vehicle 70 and the other vehicle 72 as detected by the peripheral information detecting unit 12, the position of the user's own vehicle 70 as measured by the positioning unit 16, and the speed, etc., of the user's own vehicle 70 as determined by the vehicle speed determining unit 18. In addition, the collision avoidance determining unit 46 calculates numerical values such as the TTC, etc., which are used for determining a collision, and determines whether or not there is a concern that the user's own vehicle 70 will interfere with the margin area MA.

In step S14, the need for collision avoidance support is determined. In the case it is determined from the judgment result of step S13 that collision avoidance support is necessary (step S14: YES), the routine proceeds to step S15, and the collision avoidance support process is implemented. On the other hand, in the case it is determined from the judgment result of step S13 that collision avoidance support is unnecessary (step S14: NO), then the series of process steps with respect to the stationary object is brought to an end without implementing the collision avoidance support process.

In step S15, the collision avoidance support process is implemented. The collision avoidance determining unit 46 outputs an instruction signal for instructing that collision avoidance support be implemented. When this is done, the collision avoidance operating unit 22 is operated corresponding to the instruction signal, and collision (interference) of the user's own vehicle 70 with respect to the margin area MA is avoided. More specifically, the braking device 50 is operated, and the user's own vehicle 70 is stopped in front of the margin area MA. So-called automatic braking is activated. Alternatively, the steering device 52 is operated, the margin area MA is avoided, and the user's own vehicle 70 continues to be driven.

The above features are implemented by way of a series of process steps carried out by the collision avoidance support device 10. Next, the respective processes of steps S8 through S12, which are included in the series of process steps shown in FIG. 3, will be described.

FIG. 4 is a flowchart for describing a vehicle type determining process. In step S8 of FIG. 3, the following process steps are carried out. In step S21, the vehicle type determining unit 34 acquires vehicle type information of the other vehicle 72 through the communications unit 14. In step S22, it is determined whether or not the vehicle type information is available. If vehicle type information is included in the information acquired from the other vehicle 72 (step S22: YES), the routine proceeds to step S23. On the other hand, if communications cannot be established between the communications unit 14 of the user's own vehicle 70 and the communications device 90 of the other vehicle 72, or if vehicle type information is not included in the information acquired from the other vehicle 72 (step S22: NO), the vehicle type determining process is brought to an end.

In step S23, from the vehicle type information of the other vehicle 72, the judgment condition easing unit 44 determines an amount of movement of a door with respect to the vehicle width direction. In addition, the margin area MA is enlarged corresponding to the amount of movement of the door. More specifically, the margin area MA is enlarged in the vehicle width direction the more, the larger the amount of movement of the door becomes in the vehicle width direction. In the case that the margin area MA has already been enlarged, the judgment condition easing unit 44 enlarges further the already enlarged margin area MA. At this time, the amount of enlargement in the vehicle width direction is determined corresponding to the vehicle type specified by the vehicle type information.

FIG. 5 is a flowchart for describing an engine operation determining process. In step S9 of FIG. 3, the following process steps are carried out. In step S31, the engine operation determining unit 36 acquires the engine operation information of the other vehicle 72 through the communications unit 14. In step S32, based on the engine operation information, it is determined whether or not the engine of the other vehicle 72 is stopped. If the engine is stopped (step S32: YES), the routine proceeds to step S33. If the engine is not stopped (step S32: NO), the routine proceeds to step S35.

In step S33, it is determined whether or not it is within a predetermined time period from stopping of the engine of the other vehicle 72. In the case that it remains within the predetermined time period since the engine was stopped (step S33: YES), then the possibility for a door of the other vehicle 72 to be opened and for the driver or a passenger to disembark from the other vehicle 72 is high. Thus, in step S34, the judgment condition easing unit 44 enlarges the margin area MA in the vehicle width direction. In the case that the margin area MA has already been enlarged, the judgment condition easing unit 44 enlarges further the already enlarged margin area MA. On the other hand, in the case that the predetermined time period since the engine was stopped has elapsed (step S33: NO), then the possibility for a door of the other vehicle 72 to be opened is low. Therefore, the judgment condition easing unit 44 brings the engine operation determining process to an end without enlarging the margin area MA.

In step S35, it is determined whether or not it is within a predetermined time period since the engine of the other vehicle 72 was started. In the case that it remains within the predetermined time period since the engine was started (step S35: YES), then the possibility for the other vehicle 72 to start off traveling is high. Thus, in step S36, the judgment condition easing unit 44 enlarges the margin area MA in the vehicle traveling direction.

For example, as shown in FIG. 6A, if the other vehicle 72 is stopped along a substantially parallel direction with respect to a traveling lane L, then the judgment condition easing unit 44 enlarges the margin area MA in an obliquely forward direction of the other vehicle 72. Further, as shown in FIG. 6B, if the other vehicle 72a is stopped along a substantially perpendicular direction with respect to the traveling lane L, then the judgment condition easing unit 44 enlarges the margin area MA in a forward direction, i.e., in front, of the other vehicle 72a. Moreover, in FIG. 6B, only the engine of the other vehicle 72a is operating, and the engines of the other vehicles 72, 72 are not operating. Therefore, only the margin area MA of the other vehicle 72a in the forward direction is enlarged, whereas the margin areas MA of the other vehicles 72, 72 are not enlarged in the forward direction.

In the case that the margin area MA has already been enlarged, the judgment condition easing unit 44 enlarges further the already enlarged margin area MA. On the other hand, in the case that the predetermined time period since the engine was started has elapsed (step S35: NO), then the possibility for the other vehicle 72 to start off traveling is low. Therefore, the judgment condition easing unit 44 brings the engine operation determining process to an end without enlarging the margin area MA.

FIG. 7 is a flowchart for describing a gear range determining process. In step S10 of FIG. 3, the following process steps are carried out. In step S41, the gear range determining unit 38 acquires the gear range (shift range) information of the other vehicle 72 through the communications unit 14. In step S42, based on the gear range information, the gear range that is set in the other vehicle 72 is determined. In the case that the gear range is a driving range in relation to a forward direction, such as D (drive) for example (step S42: driving range (forward)), then the routine proceeds to step S43. In the case that the gear range is a driving range in relation to a rearward direction, such as R (reverse) (step S42: driving range (rearward)), then the routine proceeds to step S44. In the case that the gear range is another range, such as P (parking) or N (neutral) (step S42: other), then the gear range determining process is brought to an end.

If the gear range of the other vehicle 72 is in a driving range, then the possibility for the other vehicle 72 to start off traveling is high. Thus, in step S43, the judgment condition easing unit 44 enlarges the margin area MA in the traveling direction (forward direction) of the vehicle. For example as shown in FIGS. 6A and 6B, the judgment condition easing unit 44 enlarges the margin area MA along the expected traveling direction (forward direction) of the other vehicle 72. In the case that the margin area MA has already been enlarged, the judgment condition easing unit 44 enlarges further the already enlarged margin area MA.

In step S44, the judgment condition easing unit 44 enlarges the margin area MA in the traveling direction (rearward direction) of the vehicle. The judgment condition easing unit 44 enlarges the margin area MA along the expected traveling direction (rearward direction) of the other vehicle 72. In the case that the margin area MA has already been enlarged, the judgment condition easing unit 44 enlarges further the already enlarged margin area MA.

FIG. 8 is a flowchart for describing a steering input determining process. In step S11 of FIG. 3, the following process steps are carried out. In step S51, the steering input determining unit 40 acquires steering input information of the other vehicle 72 through the communications unit 14. In step S52, it is determined whether or not there is a steering input. If there is a steering input (step S52: YES), the routine proceeds to step S53. If there is not a steering input (step S52: NO), the steering input determining process is brought to an end.

In step S53, the judgment condition easing unit 44 enlarges the margin area MA in the width direction of the vehicle. In the case that the margin area MA has already been enlarged, the judgment condition easing unit 44 enlarges further the already enlarged margin area MA.

FIG. 9 is a flowchart for describing a stopped position determining process. In step S12 of FIG. 3, the following process steps are carried out. In step S61, the stopped position determining unit 30 acquires stopped position information of the other vehicle 72 and road surface information from the peripheral information detecting unit 12. In step S62, it is determined whether or not the stopped position is on a road shoulder. If the stopped position is on a road shoulder (step S62: YES), the routine proceeds to step S63. If the stopped position is not on a road shoulder (step S62: NO), then the stopped position determining process is brought to an end.

In step S63, the judgment condition easing unit 44 enlarges the margin area MA in the width direction of the vehicle. In the case that the margin area MA has already been enlarged, the judgment condition easing unit 44 enlarges further the already enlarged margin area MA.

Summary of the Present Embodiment

The collision avoidance support device 10 according to the present embodiment is equipped with the stationary object detecting unit 26 that detects a stationary object, and the collision avoidance determining unit 46 that determines a need for collision avoidance support in relation to the stationary object based on a predetermined judgment condition (margin area MA). In the event the collision avoidance determining unit 46 determines that there is a need for collision avoidance support, the collision avoidance support is carried out. Furthermore, the collision avoidance support device 10 also includes the classification determining unit 28 that determines the classification of the stationary object, and the judgment condition easing unit 44 which, in the event the classification determining unit 28 determines that the stationary object is another vehicle 72 (step S4 of FIG. 3: YES), eases the judgment condition (enlarges the margin area MA), and thereby makes it easier for the collision avoidance determining unit 46 to determine that the collision avoidance support is needed.

There is a possibility for the stationary state to suddenly change such as, for example, if the other vehicle 72 suddenly starts to move or a door of the other vehicle 72 is suddenly opened, etc. In the present embodiment, it is determined whether or not the stationary object is another vehicle 72, and if it is determined to be another vehicle 72, the judgment condition, which is used when determining the need for collision avoidance support, is eased (the margin area MA is enlarged), and thus it is made easier to determine that the collision avoidance support is needed. According to the present embodiment, the collision avoidance support can be enabled with respect to the other vehicle 72, which is stationary, with starting of traveling or opening of a door of the other vehicle 72 being taken into account. More specifically, a collision avoidance support which is suitable for a vehicle that is stationary can be carried out.

Further, with the present embodiment, in the event there is an occupant riding in the other vehicle 72 (step S6 of FIG. 3: YES), the judgment condition easing unit 44 eases the judgment condition (enlarges the margin area MA), and thereby makes it easier for the collision avoidance determining unit 46 to determine that the collision avoidance support is needed (step S7 of FIG. 3).

Further, according to the present embodiment, the judgment condition easing unit 44 eases the judgment condition (enlarges the margin area MA) the more, the greater a movement amount of a door of the other vehicle 72 becomes in a width direction of the vehicle, and thereby makes it easier for the collision avoidance determining unit 46 to determine that the collision avoidance support is needed (step S23 of FIG. 4).

Further, with the present embodiment, in the event that an engine of the other vehicle 72 is stopped (step S32 of FIG. 5: YES), the judgment condition easing unit 44 eases the judgment condition (enlarges the margin area MA) in the width direction of the vehicle, and thereby makes it easier for the collision avoidance determining unit 46 to determine that the collision avoidance support is needed (step S34 of FIG. 5).

Further, according to the present embodiment, in the event it is within a predetermined time period since the engine of the other vehicle 72 was stopped (step S33 of FIG. 5: YES), the judgment condition easing unit 44 eases the judgment condition (enlarges the margin area MA) in the width direction of the vehicle, and thereby makes it easier for the collision avoidance determining unit 46 to determine that the collision avoidance support is needed (step S34 of FIG. 5).

Further, with the present embodiment, in the event that an engine of the other vehicle 72 is being started (step S32 of FIG. 5: NO), the judgment condition easing unit 44 eases the judgment condition (enlarges the margin area MA) in the traveling direction of the vehicle, and thereby makes it easier for the collision avoidance determining unit 46 to determine that the collision avoidance support is needed (step S36 of FIG. 5).

Further, according to the present embodiment, in the event it is within a predetermined time period since the engine of the other vehicle 72 was started (step S35 of FIG. 5: YES), the judgment condition easing unit 44 eases the judgment condition (enlarges the margin area MA) in the traveling direction of the vehicle, and thereby makes it easier for the collision avoidance determining unit 46 to determine that the collision avoidance support is needed (step S36 of FIG. 5).

Further, with the present embodiment, in the event that the gears of the other vehicle 72 are in a driving range (step S42 of FIG. 7: D, R), the judgment condition easing unit 44 eases the judgment condition (enlarges the margin area MA) in the traveling direction of the vehicle corresponding to the driving range, and thereby makes it easier for the collision avoidance determining unit 46 to determine that the collision avoidance support is needed (steps S43, S44 of FIG. 7).

Further, with the present embodiment, in the event that a steering input is made with respect to the other vehicle 72 (step S52 of FIG. 8: YES), the judgment condition easing unit 44 eases the judgment condition (enlarges the margin area MA) in the width direction of the vehicle, and thereby makes it easier for the collision avoidance determining unit 46 to determine that the collision avoidance support is needed (step S53 of FIG. 8).

Further, according to the present embodiment, in the event that the other vehicle 72 is stopped on a road shoulder (step S62 of FIG. 9: YES), the judgment condition easing unit 44 eases the judgment condition (enlarges the margin area MA) in the width direction of the vehicle, and thereby makes it easier for the collision avoidance determining unit 46 to determine that the collision avoidance support is needed (step S63 of FIG. 9).

According to the present embodiment, a collision avoidance support which is suitable for a vehicle that is stopped can be carried out.

Other Embodiments

The present invention is not limited to the embodiment described above, and it is a matter of course that various additional or alternative configurations may be adopted without departing from the scope of the invention as set forth in the appended claims.

For example, in the process flow shown in FIG. 3, in the event it is determined in step S6 that an occupant is riding in the other vehicle 72, then the vehicle type determining process, the engine operation determining process, the gear range determining process, the steering input determining process, and the stopped position determining process, as shown in steps S8 through S12, are carried out, whereas in the event that an occupant is not riding in the other vehicle 72, the respective processes are not carried out. However, irrespective of the determination result of step S6, the processes of steps S8 through S12 can still be carried out.

Further, in the above-described embodiment, rider information, vehicle type information, engine operation information, gear range information, and steering input information, which are output from the other vehicle 72, are acquired through the communications unit 14. However, other information can also be acquired. For example, information indicative of operations that ordinarily are performed accompanying traveling of the vehicle, for example, light illumination information, operation information of turn signal indicators, information of braking operations, etc., may also be acquired. In short, various kinds of information that are detected when a driver or passenger is riding in the vehicle can be acquired, and can be used for determining the need for collision avoidance support.

Further, the enlargement amount or the shape of the margin area MA may be fixed in each of the respective processes, or may be changed for each of such processes.

Further, the enlargement amount or the shape of the margin area MA may be changed corresponding to the vehicle type.

Moreover, among the other vehicles 72, as described in the aforementioned embodiment, it goes without saying that such other vehicles may include automobiles of four wheels or more, but may also include two wheel vehicles such as motorcycles. Cases may exist in which devices for enabling vehicle-to-vehicle communications are not provided in motorcycles. In such cases, various types of information can be acquired by performing short range communications, e.g., Bluetooth (registered trademark), with a portable terminal device such as a smart phone or the like possessed by the driver or a passenger. Similarly, in the case of automobiles as well, short range communications can be carried out with a portable terminal device such as a smart phone or the like possessed by the driver or a passenger.

According to the above-described embodiment, as shown in FIG. 2, the user's own vehicle 70 sets a margin area MA around a stationary object (other vehicle 72) as a judgment condition for determining the need for collision avoidance support with respect to the other vehicle 72. Further, by enlarging the margin area MA, it is made easier to determine that the collision avoidance support is needed. However, the judgment condition is not limited to setting a margin area MA, and can be suitably changed. For example, by modifying a coefficient used for calculating the TTC, it also can be made easier to determine that collision avoidance support is needed.

What is claimed is:

1. A collision avoidance support device, comprising:
a stationary object detecting unit configured to detect a stationary object; and
a collision avoidance determining unit configured to determine a need for collision avoidance support in relation to the stationary object based on a predetermined judgment condition;
wherein, in a case where the collision avoidance determining unit determines that there is a need for collision avoidance support, the collision avoidance support device performs the collision avoidance support, the collision avoidance support device further comprising:
a classification determining unit configured to determine a classification of the stationary object;
a rider determining unit configured to determine that there is an occupant inside the stationary object;
a judgment condition easing unit configured to, in a case where the classification determining unit determines that the stationary object is a vehicle, ease the judgment condition based on a judgment result made by the rider determining unit, and thereby make it easier for the collision avoidance determining unit to determine that the collision avoidance support is needed; and
a collision avoidance operating unit including an automatically operated braking device and an automatically operated steering device,
wherein, in a case where the rider determining unit determines that there is an occupant riding in the vehicle, the judgment condition easing unit eases the judgment condition, and thereby makes it easier for the collision avoidance determining unit to determine that the collision avoidance support is needed, and
wherein, in a case where the collision avoidance determining unit determines a need for collision avoidance support, the collision avoidance operating unit operates at least one of the automatically operated braking device and the automatically operated steering device to implement the collision avoidance support.

2. A collision avoidance support device, comprising:
a stationary object detecting unit configured to detect a stationary object; and
a collision avoidance determining unit configured to determine a need for collision avoidance support in relation to the stationary object based on a predetermined judgment condition:
wherein, in a case where the collision avoidance determining unit determines that there is a need for collision avoidance support, the collision avoidance support device performs the collision avoidance support, the collision avoidance support device further comprising:
a classification determining unit configured to determine a classification of the stationary object;
an engine operation determining unit configured to determine a state of an engine of the stationary object;
a judgment condition easing unit configured to, in a case where the classification determining unit determines that the stationary object is a vehicle, ease the judgment condition based on a judgment result made by the engine operation determining unit, and thereby make it easier for the collision avoidance determining unit to determine that the collision avoidance support is needed,
wherein the judgment condition easing unit eases the judgment condition depending on the state of the engine of the vehicle determined by the engine operation determining unit, and thereby makes it easier for the collision avoidance determining unit to determine that the collision avoidance support is needed.

3. The collision avoidance support device according to claim 2, wherein, the engine operation determining unit determines whether the engine of the vehicle is stopped, and wherein, in a case where the engine operation determining unit judges the engine of the vehicle to be stopped, the judgment condition easing unit eases the judgment condition in a width direction of the vehicle, and thereby makes it easier for the collision avoidance determining unit to determine that the collision avoidance support is needed as a precaution for a possible opening of a door of the vehicle.

4. The collision avoidance support device according to claim 3, wherein, in a case where the engine operation determining unit judges that an engine is within a predetermined time period since having been stopped, the judgment condition easing unit eases the judgment condition in the width direction of the vehicle, and thereby makes it easier for the collision avoidance determining unit to determine that the collision avoidance support is needed.

5. The collision avoidance support device according to claim 2, wherein the engine operation determining unit determines whether the engine of the vehicle is being started, and wherein, in a case where the engine operation determining unit judges that the engine of the vehicle is being started, the judgment condition easing unit eases the judgment condition in a traveling direction of the vehicle, and thereby makes it easier for the collision avoidance determining unit to determine that the collision avoidance support is needed as a precaution for the possibility that the vehicle is about to move.

6. The collision avoidance support device according to claim 5, wherein in a case where the engine operation determining unit judges that it is within a predetermined time period since the engine of the vehicle was started, the judgment condition easing unit eases the judgment condition in the traveling direction of the vehicle, and thereby makes it easier for the collision avoidance determining unit to determine that the collision avoidance support is needed.

7. A collision avoidance support device, comprising:

a stationary object detecting unit configured to detect a stationary object; and a collision avoidance determining unit configured to determine a need for collision avoidance support in relation to the stationary object based on a predetermined judgment condition;

wherein, in a case where the collision avoidance determining unit determines that there is a need for collision avoidance support, the collision avoidance support device performs the collision avoidance support, the collision avoidance support device further comprising:

a classification determining unit configured to determine a classification of the stationary object;

a judgment condition easing unit configured to, in a case where the classification determining unit determines that the stationary object is a vehicle, ease the judgment condition, and thereby make it easier for the collision avoidance determining unit to determine that the collision avoidance support is needed; and at least one of a vehicle type determining unit configured to determine a movement amount of a door of the vehicle, a gear range determining unit configured to determine whether a gear of the vehicle is in a driving range, and a steering input determining unit configured to determine whether a steering handle of the vehicle is currently being operated, wherein the judgment condition easing unit eases the judgment condition, and thereby makes it easier for the collision avoidance determining unit to determine that the collision avoidance support is needed in at least one of the cases where the movement amount of the door of the vehicle determined by the vehicle type determining unit is large in a width direction of the vehicle, where the gear of the vehicle determined by the gear range determining unit is in a driving range, and where the steering input is judged by the steering input determining unit as being made with respect to the vehicle.

* * * * *